GEORGE B. WOOD, JR.
INVENTOR.

BY Raymond A. Paquin
ATTORNEY.

May 19, 1953  G. B. WOOD, JR  2,639,193
FUEL INJECTION DEVICE
Filed Feb. 5, 1947  7 Sheets-Sheet 5

GEORGE B. WOOD, JR.
INVENTOR.

BY
ATTORNEY.

Patented May 19, 1953

2,639,193

UNITED STATES PATENT OFFICE 2,639,193

FUEL INJECTION DEVICE

George B. Wood, Jr., Springfield, Mass., assignor to American Bosch Corporation, Springfield, Mass., a corporation of New York Application February 5, 1947, Serial No. 726,489

5 Claims. (Cl. 299—107.6)

This invention relates to fuel injection devices for internal combustion engines or the like and has particular reference to a new and improved accumulator type nozzle construction and also to new and improved means for mounting such a nozzle on an engine or the like.

An object of the invention is to provide a new and improved accumulator type fuel injection nozzle.

Another object of the invention is to provide such a nozzle wherein fuel may be fed to radial spray holes without a large sac volume.

Another object of the invention is to provide such a nozzle wherein the volume of fuel between the nozzle check valve and the fuel injection pump may be retained at a minimum and which thus increases the volumetric efficiency of the fuel injection pump and also increases the cyclic regularity of injection, especially at low delivery.

Another object of the invention is to provide a nozzle of the type set forth wherein the close fitting guide surfaces around the nozzle needle are eliminated, thereby eliminating the possibility of binding and also reducing the cost of the nozzle by eliminating the forming of the close fits between the needle and said guide surfaces and thereby providing a more economical and trouble-free construction.

Another object of the invention is to provide new and improved means for mounting a nozzle of the type set forth on an engine.

Other objects and advantages of the invention will be apparent from the following description taken in connection with the accompanying drawings. Many changes may be made in the details of construction without departing from the invention as shown and described, as the preferred forms have been given by way of illustration only.

Referring to the drawings:

Fig. 5 is a sectional view showing the nozzle construction of Fig. 3 on an enlarged scale;

Figures 1, 14A:
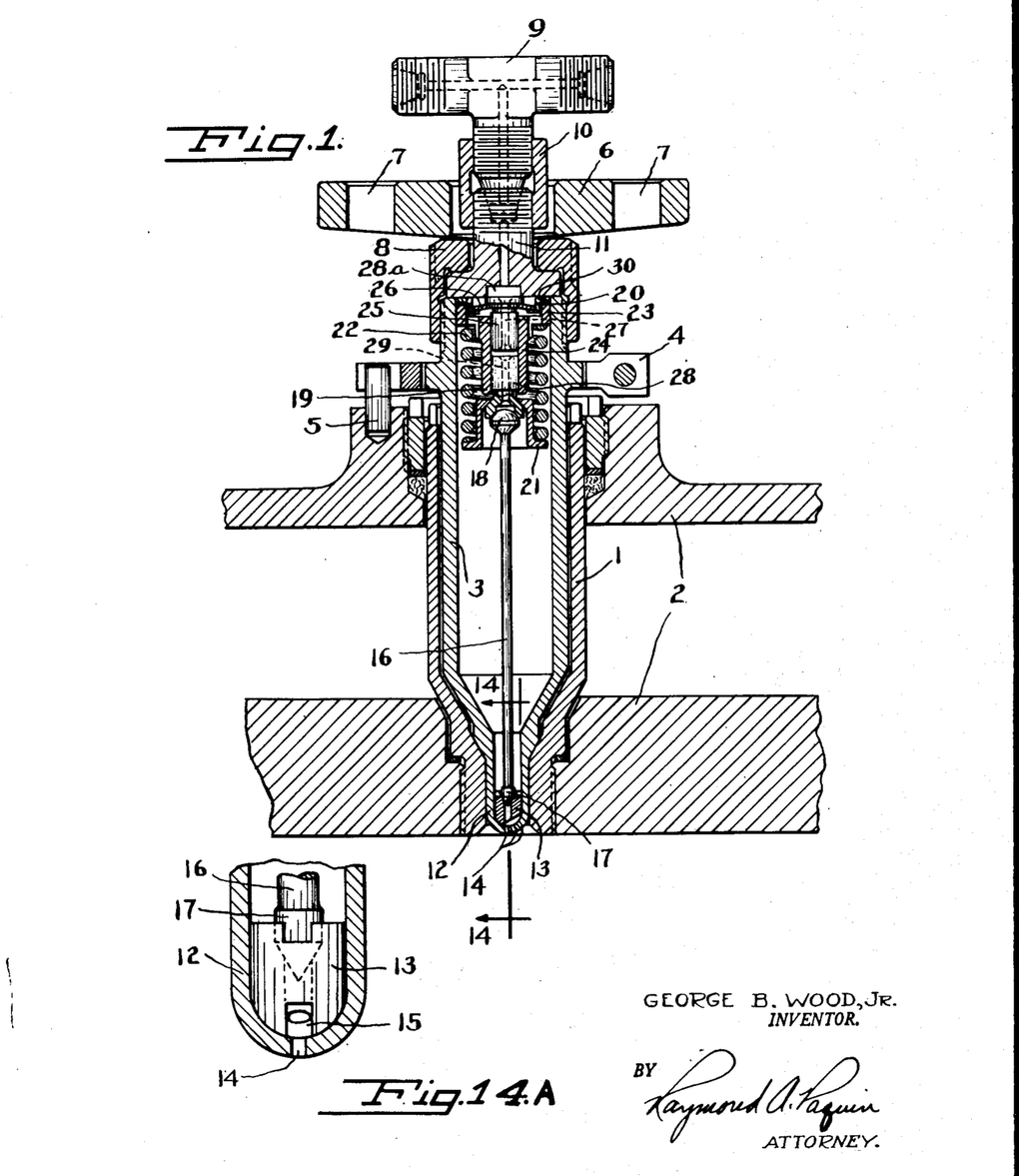
Fig. 1 is a sectional view showing a nozzle embodying the present invention in position on the cylinder wall of an engine.
Fig. 14A is a sectional view on an enlarged scale, taken on line 14—14 of Fig. 1.

Referring more particularly to the drawings, wherein similar reference characters designate corresponding parts throughout the various views of the drawings, there is shown in Fig. 1 a construction which comprises a nozzle holder body 1 which extends through the cylinder wall indicated generally at 2. The nozzle 3 is positioned within the nozzle body holder 1 and is located therein by means of the clamp 4 and locating pin 5 and is adapted to be retained within said holder body 1 by means of the collar 6 having the openings 7 through which bolts are adapted to extend to retain the collar 6 in engagement with the retaining nut 8 which is connected to the upper end of the nozzle 3 by a threaded connection to retain the parts in operative relation. The fitting 9 is adapted to be connected to the fuel supply line, not shown, and to be retained in operative position on a nozzle to supply fuel thereto by means of the threaded portion on the fitting 9 and another threaded portion in engagement with the threaded portion on the cap 11.

The cap portion 11 is retained in position on the upper peripheral surface of the nozzle body 3 by means of the annular cap nut 8 which has a flange engaging a peripheral flange on the cap 11 and which also has a threaded portion in threaded engagement with a threaded portion adjacent the upper edge of the nozzle body 3 and the adjacent engaging faces of said cap 11 and nozzle body 3 are lapped to provide a leakproof construction. It is pointed out that with the present type accumulator nozzle construction that only this single seal or engaging lapped faces is provided, thereby considerably reducing the cost of producing the construction.

The nozzle body 3 has the reduced extension 12 which extends through the holder body 1 for allowing the spraying of fuel into the cylinder or combustion chamber.

Within the reduced extension 12 on the nozzle body 3 is positioned the insert 13 which is pressed or shrunk into said reduced extension 12 which has an opening therein for allowing the passage of fuel from the accumulator chamber through the radial spray holes 14 which are aligned with the groove 15 whereby the fuel may be fed to the radial spray holes 14 without a large sac volume.

The nozzle needle 16 has one end 17 seated in a seat in the upper side of the insert 13 and its opposite end 18 in engagement with the lift stop 19, the position of which may be adjusted by the use of shims 20.

Adjacent the lower end 19 of member 24 is located the rocking spring hanger member 21 against which rests the lower end of the coil spring 22, the opposite end of which rests against the portion 23 of the upper spring seat and which portion 23 has the cylindrical extension 24 forming a cylinder into which is positioned the tubular end of the check valve 25 supporting the check valve return spring 26 which is an annular, resilient member. The check valve member 25 has the central opening or bore 27. Within said cylinder 24 is also positioned the piston 28 having the central bore 29. This piston 28 has at its lower end a seat for the end 18 of the nozzle needle 16. The piston 28 is movably mounted within said cylinder 24.

It will be noted that there are no guides or close fits around the outer peripheral surface of the needle 16, thereby eliminating the possibility of seizure or binding of said needle in any such guide and also eliminating the necessity of forming the guide with the necessary close tolerances and dimensions and thus providing a much more economical and trouble-free construction.

The present construction also keeps the dead volume, that is, the volume between the nozzle check valve and the injection pump at a minimum and thereby increases the volumetric efficiency of the pump and the cyclic regularity of injection, especially at low delivery.

It will also be noted that the needle 16 is located at the top and bottom, so that it will always be well aligned even though not working in guides. In this connection attention is called to the rocking spring hanger 21 whereby slight misalignment of the spring 22 will not affect operation of the nozzle.

Another advantage of the present construction is the fact that it requires only a single seal between lapped faces of the upper surface of the nozzle body 3 and the lower surface of the member 11 thereby reducing the number of such seals to a minimum and thereby further reducing the cost of the construction.

Above the delivery valve 25 is provided the relief chamber 28a, the diameter of which is slightly larger than the diameter of the cylinder or barrel 24 in which the pistons 25 and 28 are mounted.

In the operation of the nozzle, fuel entering the relief chamber 28a passes through the opening 27 in the piston 25 and the opening 28 in the piston 28 and applies pressure against the upper surface of the piston 28 and also against the upper end 18 of the needle 16 and also to the top of the check valve 25 and fuel also enters the accumulator chamber through the passages 30. At the end of the pumping stroke, pressure in the fuel line is relieved and the check valve 25 opens under pressure of the fuel in the accumulator chamber and the pressure of fuel trapped in the accumulator chamber lifts the needle 16, piston 28 and spring hanger 21 against the force of the spring 22 allowing fuel to pass from the accumulator chamber into the cylinder or combustion chamber until the force of the spring 22 overcomes the residual pressure in the accumulator chamber whereupon the spring 22 causes downward movement of the needle 16 and the end 17 of the needle closes the fuel passage in the insert 13 to thereby prevent further delivery of fuel to the cylinder or combustion chamber until the next pumping stroke or cycle of the pump at which time the above described action is repeated.

Figure 2:
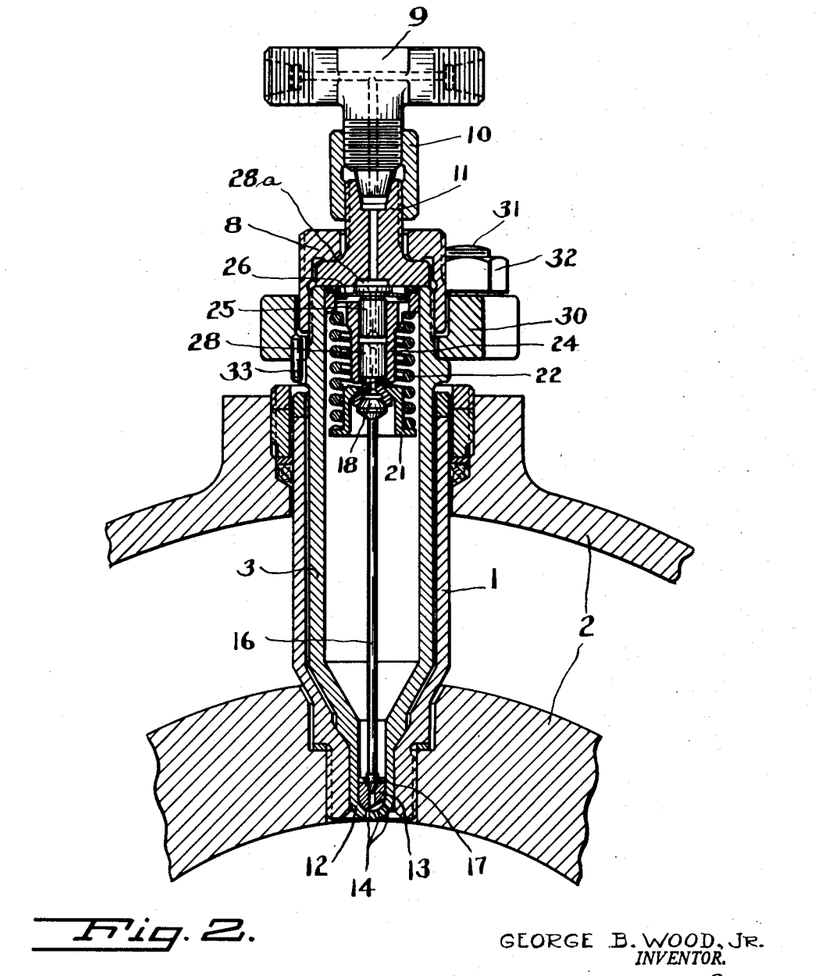
Fig. 2 is a view similar to Fig. 1 but showing somewhat different means for mounting the nozzle on the cylinder wall.

In the form of the invention shown in Fig. 2, the accumulator nozzle construction is similar to that shown in Fig. 1, but a different means for securing or holding the nozzle in position on the engine cylinder is provided. In this case the mounting bracket 30 is adapted to be secured by bolts 31 and nuts 32 and the locating pin 33 is provided for properly positioning the nozzle body. Otherwise the construction for function of this form of the invention is the same as that previously described.

Figure 3:
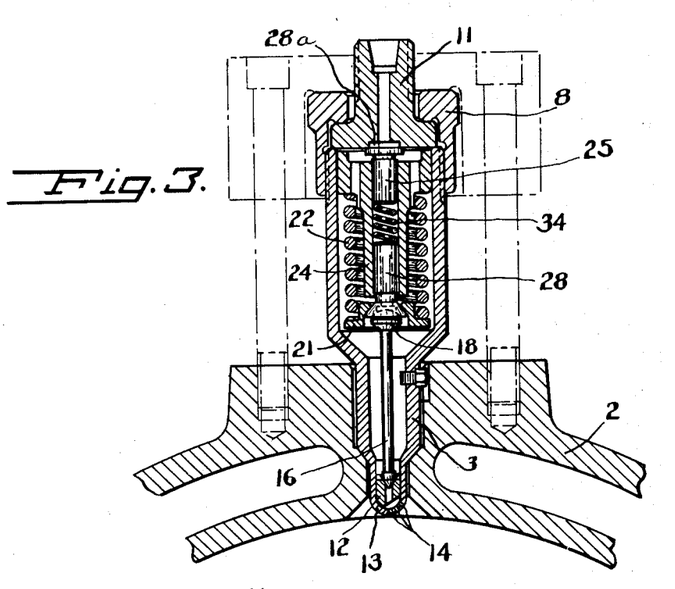
Fig. 3 is a sectional view of a slightly modified form of the invention.

The construction shown in Fig. 3 is generally similar to that shown in Figs. 1 and 2 except that a coil spring 34 is provided between the pistons 25 and 28, which coil spring operates in place of the flat delivery valve spring 26 described in connection with the prior constructions. Also, in Fig. 3 the construction does not embody the mounting body 1 but shows the nozzle itself positioned directly into the cylinder wall.

Figure 4:
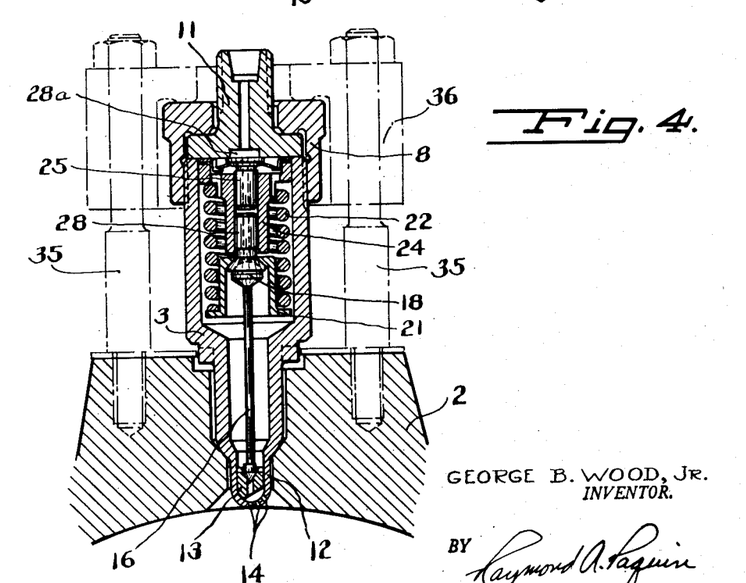
Fig. 4 is a sectional view of another slightly modified form of the invention.

In Fig. 4 a nozzle of the type shown in Figs. 1 and 2 has been shown mounted directly into the cylinder wall with bolts 35 and holding bracket 36 for retaining the nozzle in position on the cylinder wall.

In Fig. 5 there has been shown on a somewhat enlarged scale a construction of the nozzle shown in Fig. 3.

Figures 6, 7, 8:
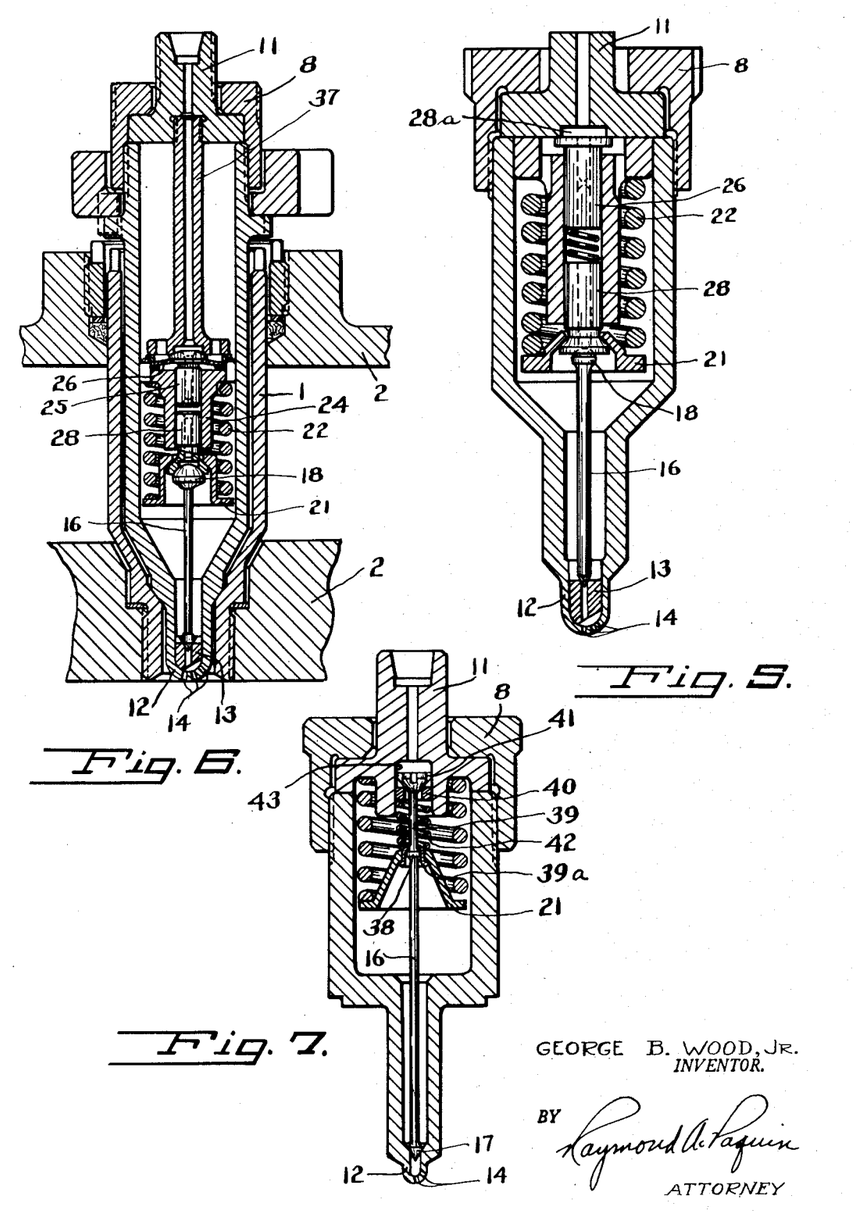
Fig. 6 is a sectional view showing another slightly modified form of the invention.
Fig. 7 is a sectional view showing another modified form of the invention.
Fig. 8 is a sectional view of another slightly modified form of the invention.

In Fig. 6 there has been shown a construction generally similar to Figs. 1 and 2 except that the tubular extension 37 has been provided between the fuel line and the delivery valve which allows the use of a short needle instead of the longer needle shown in the earlier constructions whereby there is less tendency of the needle to buckle or get out of alignment.

In Fig. 7 there has been shown a construction with a somewhat different check valve in that the needle 16 has a shoulder 38 on which is mounted the split lock 39a with the spring hanger 21. The needle has an extension 39 extending through the annular check valve piston 40 with the check valve member 41 adapted to function in cooperation with the check valve piston 40. In this construction a second coil spring 42 is provided between the lower surface of the check valve piston 40 which is movably mounted in the cylinder 43 and the opposite end of said spring 42 rests against the split lock 39.

In the form of the invention shown in Fig. 8, there is provided a tubular extension 44 of reduced size against the end of which is positioned the spring hanger 21 and on which is positioned a check valve 45 for the coil spring 46 of reduced size for actuating said check valve.

Figure 9:
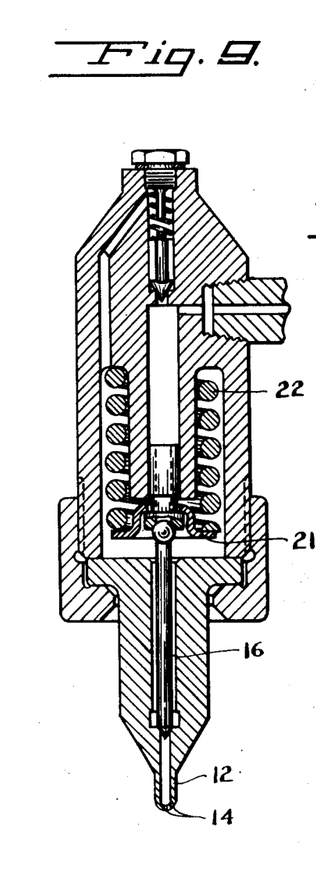
Fig. 9 is a sectional view showing the invention applied to a nozzle having conventional type check valve and side fittings.

In Fig. 9 the construction has been shown adapted to a nozzle having a normal type check valve and a side fitting for supplying fuel to the nozzle.

Figures 8, 10:
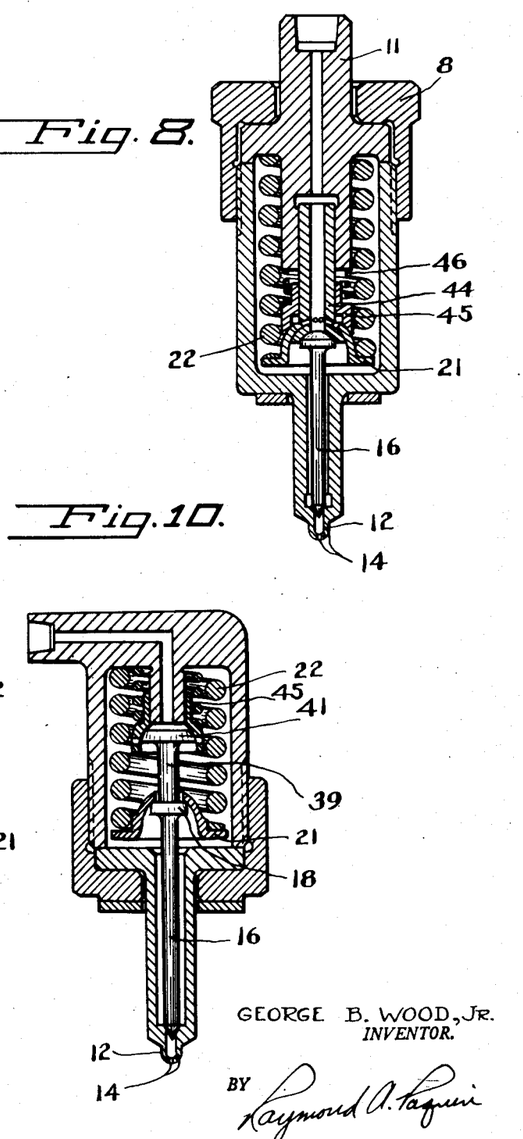
Fig. 10 is a sectional view showing the nozzle with the check valve adjacent the upper end thereof.

In Fig. 10 has been shown a construction similar in some respects to that shown in Fig. 7 in that needle 16 has an extension 39, which extension 39 has a portion functioning as check valve. The member 45 has openings to allow entry of fuel into the accumulator chamber.

Figures 11, 12, 13:
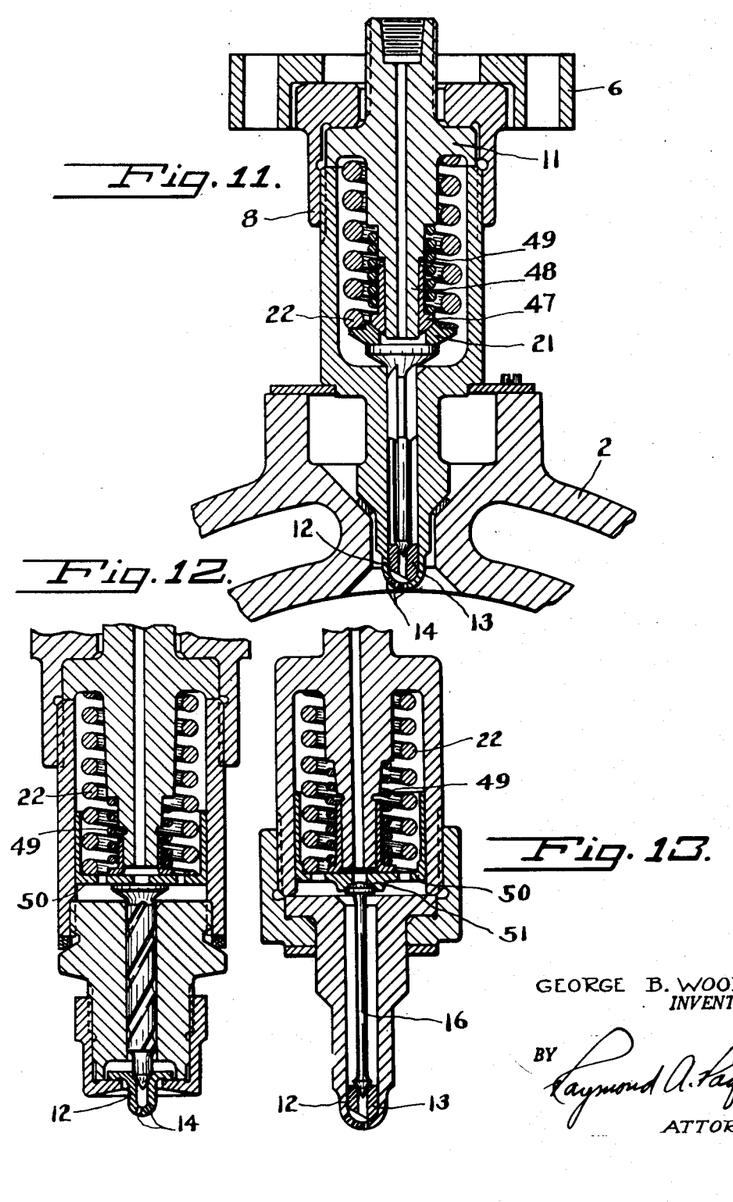
Fig. 11 is a sectional view of a slightly modified form of the invention.
Fig. 12 is a sectional view showing a nozzle generally similar to that of Fig. 11.
Fig. 13 is a view generally similar to Fig. 12 but showing a guided needle.

In Fig. 11 there has been shown a construction having a slightly modified form of needle and check valve. In this construction the upper end of the needle engages the spring hanger 21 which, in turn, engages the lower end of the check valve member 47 which is slidably mounted on the tubular extension 48 on the member 11 and the second coil spring of reduced size is provided for actuating the check valve member 47.

In Fig. 12 there has been shown the cup-shaped spring hanger 50 slidably mounted within the accumulator chamber. Otherwise this arrangement is generally similar to that shown in Fig. 11, and in Fig. 13 there has been shown a construction generally similar to that shown in Fig. 12 except that the cup-shaped spring hanger member 50 is provided with a seat 51 for the upper surface of the needle 16 whereby the needle is guided by said member 50.

Figures 14, 15:
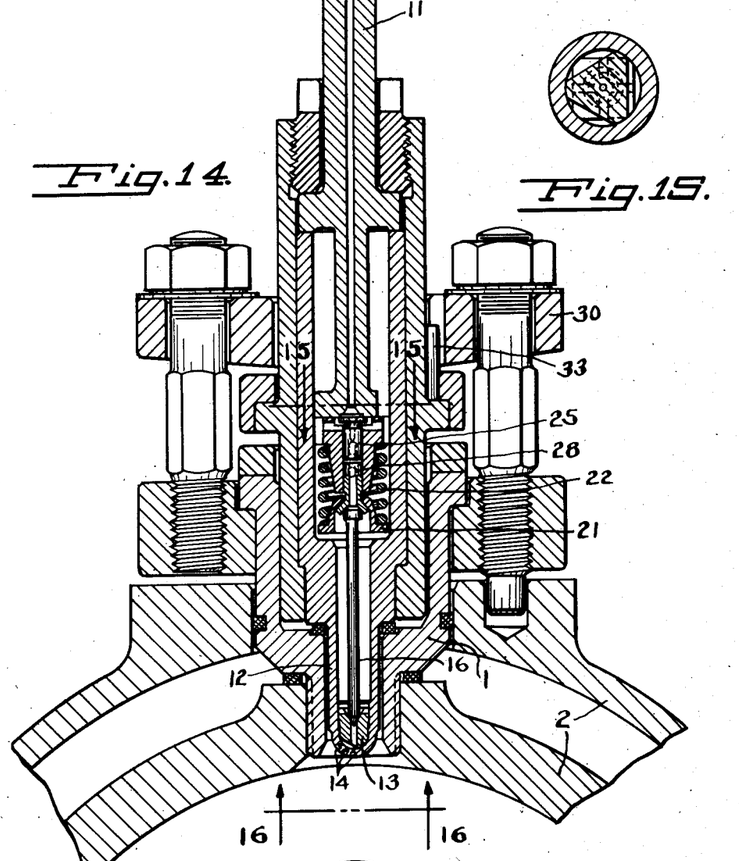
Fig. 14 is a sectional view of a slightly modified form of the invention.
Fig. 15 is a sectional view taken on line 15—15 of Fig. 14 looking in the direction of the arrows.
Figure 16:
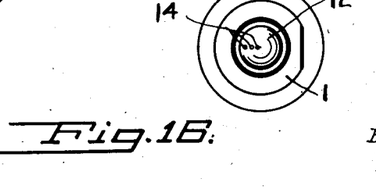
Fig. 16 is a fragmentary end view taken on line 16—16 of Fig. 14 and looking in the direction of the arrows.

In Fig. 14 has been shown a slightly modified construction which is generally similar to the form of the invention shown in Fig. 2 but shows the check valve constructed without the spring 26. In this form different means have been shown for mounting the injector on the engine cylinder and also the internal arrangement of the nozzle has been changed so that a part of the accumulator chamber is positioned above the check valve which allows a shortened valve needle construction.

From the foregoing it will be seen that I have provided simple, efficient and economical means for obtaining all of the objects and advantages of the invention.

Having described my invention, I claim:

1. In a device of the character described, a nozzle body having a fuel inlet and fuel outlet adjacent its opposite ends, a longitudinally movable needle valve for controlling the delivery of fuel through said fuel outlet, a check valve arrangement for controlling the admission of fuel through said fuel inlet into said nozzle body, said check valve arrangement comprising a cylinder and a pair of longitudinally relatively movable piston members in said cylinder, a check valve carried by one of said piston members, said check valve being adapted to be opened by fuel inlet pressure and to be closed by fuel pressure in said nozzle body, one of said piston members having an end engaging the adjacent end of said needle valve and a spring normally urging said needle valve into position to close said outlet.

2. In a device of the character described, a nozzle body having a fuel inlet and fuel outlet adjacent its opposite ends, a longitudinally movable needle valve for controlling the delivery of fuel through said fuel outlet, a check valve arrangement for controlling the admission of fuel through said fuel inlet into said nozzle body, said check valve arrangement comprising a cylinder and a pair of longitudinally relatively movable piston members in said cylinder, a check valve carried by one of said piston members, said check valve being adapted to be opened by fuel inlet pressure and to be closed by fuel pressure in said nozzle body, the other of said piston members engaging an end of said needle valve and said check valve arrangement including a flat spring member carried by said first piston member and normally urging said check valve member toward closed position and a spring normally urging said needle valve into position to close said outlet.

3. In a device of the character described, a nozzle body having a fuel inlet and fuel outlet adjacent its opposite ends, a longitudinally movable needle valve for controlling the delivery of fuel through said fuel outlet, a check valve for controlling the admission of fuel through said fuel inlet into said nozzle body, said check valve comprising a cylinder and a longitudinally movable two part piston member in said cylinder, a check valve carried by one portion of said piston, said check valve being adapted to be opened by fuel inlet pressure and to be closed by fuel pressure in said nozzle body, the other part of said piston member being slidable in said cylinder and engaging an end of said needle valve, an opening in said slidable part of said piston member and a spring normally urging said needle valve into position to close said outlet.

4. In a device of the type set forth, a nozzle body having a fuel inlet, a check valve arrangement for controlling the admission of fuel through said fuel inlet into said nozzle body, said check valve arrangement comprising a cylinder and a pair of relatively movable piston members in said cylinder, a check valve carried by one of said piston members, a fuel outlet comprising a plurality of radial openings, a longitudinally movable needle valve for controlling said fuel outlet engaging the second piston member in said cylinder, said second piston being in alignment with and movable relative to said first piston portion, and a control member in said nozzle body adjacent said fuel outlet, said control member having a fuel passageway therethrough adapted to be controlled by said needle valve and a slot in the lower surface of said control member and fuel passageway, and aligned with said radial openings whereby fuel may be fed to said openings without a large sac volume.

5. In a device of the type set forth, a nozzle body having a fuel inlet and a fuel outlet adjacent its opposite ends, a longitudinally movable needle valve for controlling said fuel outlet, a check valve arrangement controlling the admission of fuel through said fuel inlet, said check valve arrangement comprising a cylinder and a pair of relatively movable piston members in said cylinder, a check valve member secured to one of said piston members and fuel passage means permitting passage of fuel to said nozzle body upon the opening of said check valve member, said valve member including a flat flexible member secured to said one of said piston members, said flexible member normally urging said check valve member into closed position, the second piston member engaging the needle valve urging said needle valve toward closed position.

GEORGE B. WOOD, Jr.

(References on following page)

References Cited in the file of this patent

UNITED STATES PATENTS

| Number | Name | Date |
|---|---|---|
| 1,585,277 | Bell | May 18, 1926 |
| 1,890,702 | Steiner | Dec. 13, 1932 |
| 2,068,678 | Hoadley | Jan. 26, 1937 |
| 2,075,949 | Lemon | Apr. 6, 1937 |
| 2,283,725 | Eichelberg | May 19, 1942 |
| 2,373,353 | Smith | Apr. 10, 1945 |
| 2,420,432 | Kaltinsky | May 13, 1947 |
| 2,434,329 | Meitzler | Jan. 13, 1948 |
| 2,496,804 | Meitzler | Feb. 7, 1950 |

FOREIGN PATENTS

| Number | Country | Date |
|---|---|---|
| 489,509 | Germany | Jan. 17, 1930 |
| 504,366 | Great Britain | July 19, 1937 |
| 491,821 | Germany | Feb. 12, 1930 |